(12) United States Patent
Yang et al.

(10) Patent No.: US 10,890,896 B2
(45) Date of Patent: Jan. 12, 2021

(54) MONITORING DEVICE AND METHOD THEREOF

(71) Applicant: KOREA INSTITUTE OF INDUSTRIAL TECHNOLOGY, Cheonan-si (KR)

(72) Inventors: Gi Hun Yang, Gongju-si (KR); Ji Woong Han, Daejeon (KR); Bummo Ahn, Anyang-si (KR)

(73) Assignee: KOREA INSTITUTE OF INDUSTRIAL TECHNOLOGY

( * ) Notice: Subject to any disclaimer, the term of this patent is extended or adjusted under 35 U.S.C. 154(b) by 0 days.

(21) Appl. No.: 16/486,658

(22) PCT Filed: Sep. 1, 2017

(86) PCT No.: PCT/KR2017/009608
§ 371 (c)(1),
(2) Date: Aug. 16, 2019

(87) PCT Pub. No.: WO2018/151387
PCT Pub. Date: Aug. 23, 2018

(65) Prior Publication Data
US 2020/0057426 A1    Feb. 20, 2020

(30) Foreign Application Priority Data

Feb. 17, 2017  (KR) ........................ 10-2017-0021761

(51) Int. Cl.
*G05B 19/418*   (2006.01)
*G06K 7/10*     (2006.01)
*H01B 13/012*   (2006.01)

(52) U.S. Cl.
CPC ....... *G05B 19/418* (2013.01); *G06K 7/10366* (2013.01); *H01B 13/01209* (2013.01); *G05B 2219/31229* (2013.01)

(58) Field of Classification Search
CPC ........ G05B 19/418; G05B 2219/31229; G06K 7/10366; H01B 13/01209; H01B 13/01236; H01B 13/344; B60R 16/0207
(Continued)

(56) References Cited

U.S. PATENT DOCUMENTS

| 2004/0113009 A1* | 6/2004 | Graeber | ............... B65H 63/086 |
| | | | 242/476.6 |
| 2007/0277372 A1* | 12/2007 | Aida | ..................... H01R 43/28 |
| | | | 29/747 |
| 2017/0173735 A1* | 6/2017 | Hsu | .................. C04B 35/62277 |

FOREIGN PATENT DOCUMENTS

| KR | 200272445 Y1 | 4/2002 |
| KR | 20030015554 A | 2/2003 |

(Continued)

OTHER PUBLICATIONS

Han, J.W. et al., "Development of Shot Counter System for Efficient Production Control", Proceedings of KSMTE Annual Conference, Korean Society of Manufacturing Technology Engineering, Nov. 2016, p. 195.
(Continued)

*Primary Examiner* — Vernal U Brown
(74) *Attorney, Agent, or Firm* — Harness, Dickey & Pierce, P.L.C.

(57) ABSTRACT

A monitoring device for managing at least one applicator fixture mounted on an applicator which has a magnetic body and connects a terminal to wiring via up and down movement. The monitoring device having a magnetic sensor which is mounted on the applicator and senses the movement of the magnetic body. At least one slave module receives identification information of the applicator fixture and mobility information of the magnetic body sensed by the magnetic sensor. A master module receives the identification information of the applicator fixture and the mobility infor-
(Continued)

mation of the magnetic body in real time from the at least one slave module, while an interface module generates a monitoring interface indicating the degree of use of at least one applicator fixture by using the identification information of the applicator fixture and the mobility information of the magnetic body.

12 Claims, 3 Drawing Sheets

(58) Field of Classification Search
USPC .................................................. 340/12.51
See application file for complete search history.

(56) References Cited

FOREIGN PATENT DOCUMENTS

| KR | 101234355 | B1 | 2/2013 |
| KR | 101487163 | B1 | 1/2015 |

OTHER PUBLICATIONS

International Search Report (in English and Korean) and Written Opinion (in Korean) issued in PCT/KR2017/009608, dated Mar. 19, 2018; ISA/KR.

* cited by examiner

| ID | Count | ID | Count | ID | Count | ID | Count | ID | Count |
|---|---|---|---|---|---|---|---|---|---|
| 1 | 10 | 21 | 94786 | 41 | 7946 | 61 | 86 | 81 | 49 |
| 2 | 12 | 22 | 419149 | 42 | 16 | 62 | 6 | 82 | 49 |
| 3 | 42 | 23 | 19 | 43 | 1 | 63 | 168 | 83 | 49 |
| 4 | 72 | 24 | 656 | 44 | 49 | 64 | 186 | 84 | 84 |
| 5 | 46 | 25 | 6 | 45 | 4 | 65 | 186 | 85 | 949 |
| 6 | 154 | 26 | 98 | 46 | 987 | 66 | 46 | 86 | 489 |
| 7 | 486 | 27 | 156 | 47 | 89 | 67 | 48 | 87 | 49 |
| 8 | 1563 | 28 | 1 | 48 | 4 | 68 | 798 | 88 | 78 |
| 9 | 684 | 29 | 561 | 49 | 894 | 69 | 79 | 89 | 4 |
| 10 | 21365 | 30 | 56 | 50 | 4815656 | 70 | 89 | 90 | 9 |
| 11 | 564 | 31 | 16 | 51 | 6568 | 71 | 9 | 91 | 4945 |
| 12 | 615 | 32 | 89 | 52 | 8 | 72 | 819 | 92 | 4987 |
| 13 | 156 | 33 | 0 | 53 | 618 | 73 | 8498 | 93 | 94 |
| 14 | 189 | 34 | 59 | 54 | 618 | 74 | 47 | 94 | 54 |
| 15 | 89 | 35 | 165 | 55 | 165 | 75 | 56 | 95 | 9 |
| 16 | 15869 | 36 | 0 | 56 | 478 | 76 | 769 | 96 | 495 |
| 17 | 8914 | 37 | 98 | 57 | 64 | 77 | 486 | 97 | 456 |
| 18 | 98 | 38 | 48 | 58 | 86 | 78 | 48 | 98 | 4 |
| 19 | 189 | 39 | 9 | 59 | 8 | 79 | 456789 | 99 | 56 |
| 20 | 18 | 40 | 489 | 60 | 61 | 80 | 498 | 100 | 15 |

FIG.3

MONITORING DEVICE AND METHOD THEREOF

CROSS-REFERENCE TO RELATED APPLICATIONS

This application is a 371 U.S. National Phase of International Application No. PCT/KR2017/009608, filed Sep. 1, 2017, which claims priority to Korean Patent Application No. 10-2017-0021761, filed Feb. 17, 2017. The entire disclosures of the above applications are incorporated herein by reference.

TECHNICAL FIELD

The present invention relates to a monitoring device and a monitoring method.

BACKGROUND ART

A harness, which serves as nerves and blood vessels in vehicles, heavy machinery, household electric appliances, etc. and supplies electric power, an electrical signal, a control signal, etc. required for each component, is a very important component which influences the quality, durability, etc. of a final product. For this reason, product competitiveness of vehicles, heavy machinery, etc. is directly affected by the degree of production management of a harness, such as production automation and production process monitoring.

In particular, as an apparatus for producing a harness, an applicator which connects a terminal to a wire and an applicator fixture are at the very center of production management targets. Various types of applicator fixtures are installed at the ends of applicators according to the types of connectors or wires which are products. However, a monitoring system for managing the life and the number of strokes of each applicator fixture has not currently been completed. Consequently, a harness production process has many problems, such as expiration of an appropriate time for replacing an applicator fixture and difficulty in accurately identifying a production quantity and a production flow.

DISCLOSURE

Technical Problem

The present invention is directed to providing a monitoring device and a monitoring method and more particularly, a monitoring device and a monitoring method for managing an applicator, which has a magnetic body and connects a terminal to a wire via up and down movement, and the life and the number of strokes of an applicator fixture installed at an end of the applicator.

Technical Solution

One aspect of the present invention provides a monitoring device for managing at least one applicator fixture installed on an applicator which has a magnetic body and connects a terminal to a wire via up and down movement, the monitoring device including a magnetic sensor configured to be installed in the applicator and sense movement of the magnetic body, at least one slave module configured to receive identification information of the applicator fixture and mobility information of the magnetic body sensed by the magnetic sensor, a master module configured to receive the identification information of the applicator fixture and the mobility information of the magnetic body in real time from the at least one slave module, and an interface module configured to generate a monitoring interface showing the degree of use of the at least one applicator fixture using the identification information of the applicator fixture and the mobility information of the magnetic body.

The slave module may include a radio frequency identification (RFID) reader, and the RFID reader may recognize the identification information of the applicator fixture from an RFID tag provided in the applicator fixture.

The slave module may receive the identification information from the specific applicator fixture and receive the mobility information from the magnetic sensor provided in the applicator on which the specific applicator fixture is installed.

The slave module may include an alarm unit configured to provide, when the identification information of the applicator fixture is received for the first time or the identification information of the applicator fixture is changed, a notification of the reception or the change.

The master module may include a short-range communication module, the short-range communication module may receive the identification information of the applicator fixture and the mobility information of the magnetic body from the slave module and include at least one of a Bluetooth module, an RFID module, an infrared communication module, a ZigBee module, a near-field communication (NFC) module, and a Wi-Fi module.

The master module may further include a universal asynchronous receiver-transmitter (UART) module, and the UART module may transmit the identification information and the mobility information received from the at least one slave module to the monitoring interface.

The mobility information of the magnetic body may include up and down movement number information of the applicator fixture.

The monitoring interface may display mobility information of a magnetic body corresponding to identification information of an applicator fixture on a display unit in different colors according to a predetermined reference.

The monitoring interface may control the alarm unit included in the slave master to output an alarm when the mobility information of the magnetic body exceeds the predetermined reference.

The monitoring interface may display the mobility information of the magnetic body in different areas on the display unit according to the type of applicator on which the applicator fixture is installed.

Another aspect of the present invention provides a monitoring method for managing at least one applicator fixture installed on an applicator which has a magnetic body and connects a terminal to a wire via up and down movement, the monitoring method including receiving identification information of the applicator fixture and mobility information of the magnetic body sensed by a magnetic sensor installed in the applicator, and displaying the degree of use of the applicator fixture using the received identification information of the applicator fixture and the received mobility information of the magnetic body. The mobility information of the magnetic body includes up and down movement number information of the applicator fixture, and the displaying of the degree of use of the applicator fixture includes displaying the degree of use of the applicator fixture in different colors according to a value of the up and down movement number information or in different areas according to the type of applicator on which the applicator fixture is installed.

Advantageous Effects

A monitoring device and a monitoring method according to exemplary embodiments of the present invention make it possible to automatically monitor each of a plurality of applicators or applicator fixtures in real time and enable a worker to easily understand monitoring information. Therefore, it is possible not only to manage the life and the number of strokes of an applicator and an applicator fixture but also to carry out overall production management of products employing an applicator at the same time.

Effects which can be achieved by the present invention are not limited to those mentioned above, and other effects which have not been mentioned will be clearly understood by those of ordinary skill in the art to which the present invention pertains from the following descriptions.

DESCRIPTION OF DRAWINGS

FIG. 3 illustrates a monitoring interface showing identification information and up and down movement number information of at least one applicator fixture according to another exemplary embodiment of the present invention.

MODES OF THE INVENTION

Figures 1, 2:
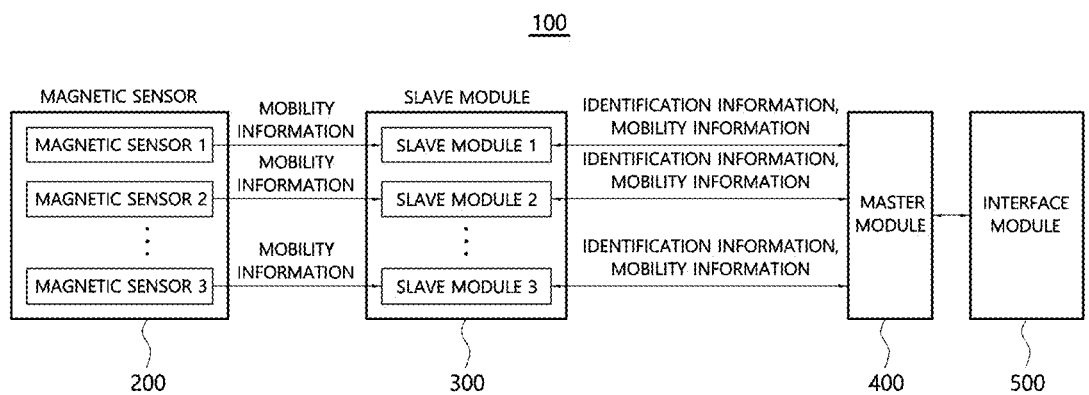
FIG. 1 illustrates a monitoring device according to an exemplary embodiment of the present invention.
FIG. 2 illustrates a monitoring interface showing identification information and up and down movement number information of at least one applicator fixture according to an exemplary embodiment of the present invention.

Hereinafter, exemplary embodiments of the present invention will be described in detail with reference to the accompanying drawings. The detailed description which will be disclosed along with the accompanying drawings is intended to illustrate the exemplary embodiments of the present invention and is not intended to provide a unique embodiment with which the present invention can be implemented. To clearly describe the present invention, parts that are irrelevant to the description may be omitted in the drawings, and identical or similar elements may be denoted by the same reference numeral throughout the specification.

In an exemplary embodiment of the present invention, the term "or," "at least one," etc. may refer to one of listed words or a combination of two or more thereof. For example, "A or B" and "at least one of A and B" may include only one of A and B or both of A and B.

It will be understood that when an element is referred to as being "connected" or "coupled" to another element in an exemplary embodiment of the present invention, the element may be directly connected or coupled to the other element or at least one intervening element may be present therebetween.

FIG. 1 illustrates a monitoring device 100 according to an exemplary embodiment of the present invention. Referring to FIG. 1, the monitoring device 100 may include a magnetic sensor 200, a slave module 300, a master module 400, and an interface module 500.

The magnetic sensor 200 may be installed in an applicator and sense movement of a magnetic body provided in the applicator. As an example, the applicator may have a stationary unit and a moving unit which moves up or down, and the magnetic sensor 200 may be installed in the stationary unit of the applicator and sense movement of a magnetic body provided in the moving unit which moves up or down. The magnetic sensor 200 may sense a magnetic field which is generated when the magnetic body moves up or down. That is, when the magnetic body moves up and down once, the magnetic sensor 200 may recognize an up and down movement number of 1. At least one magnetic sensor 200 may be provided in each of a plurality of applicators, and it is possible to know the number of strokes or the number of uses of an applicator and an applicator fixture installed on the applicator using mobility information, specifically, up and down movement number information of the magnetic body, of the magnetic body measured by the provided magnetic sensor 200.

The slave module 300 may be connected to the magnetic sensor 200 wiredly or wirelessly and receive measured mobility information of a magnetic body. The mobility information of a magnetic body includes up and down movement number information of the magnetic body.

Also, the slave module 300 may include a radio frequency identification (RFID) reader (not shown). The slave module may recognize an RFID tag installed in an applicator fixture using the RFID reader and receive or acquire identification information of the applicator fixture from the recognized RFID tag.

The slave module 300 and the magnetic sensor 200 are paired and may check and transfer the identification information of the applicator fixture received through the RFID reader and the number of strokess or the number of uses of the applicator fixture corresponding to the identification information.

The slave module 300 may include an alarm unit (not shown). The alarm unit (not shown) may output an alarm in at least one of auditory (e.g., a speaker), visual (e.g., a lamp), and tactile (e.g., vibrations) manners. The slave module 300 may output an alarm through the alarm unit when identification information is changed as identification information of an applicator fixture is received for the first time through the RFID reader or an applicator fixture is replaced with another applicator fixture.

The master module 400 may receive identification information of an applicator fixture and mobility information of a magnetic body corresponding to the identification information from the at least one slave module 300.

Specifically, the master module 400 may include a short-range communication module (not shown) and receive the identification information and the mobility information from the at least one slave module 300. The short-range communication module (not shown) may include at least one of a Bluetooth module, an RFID module, a ZigBee module, a near-field communication (NFC) module, and a Wi-Fi module. The master module 400 may receive and acquire identification information and corresponding mobility information of at least one applicator fixture and sort or arrange the identification information and the mobility information.

The interface module 500 may be connected to the master module 400 wiredly or wirelessly and receive the identification information of the at least one applicator fixture and the corresponding mobility information. For example, the interface module 500 and the master module 400 may be connected through a universal asynchronous receiver-transmitter (UART), but the present invention is not limited thereto.

The interface module 500 may output the received identification information of the at least one applicator fixture and the corresponding mobility information on a display unit (not shown). The mobility information includes up and down movement number information of a magnetic body.

Figure 3:
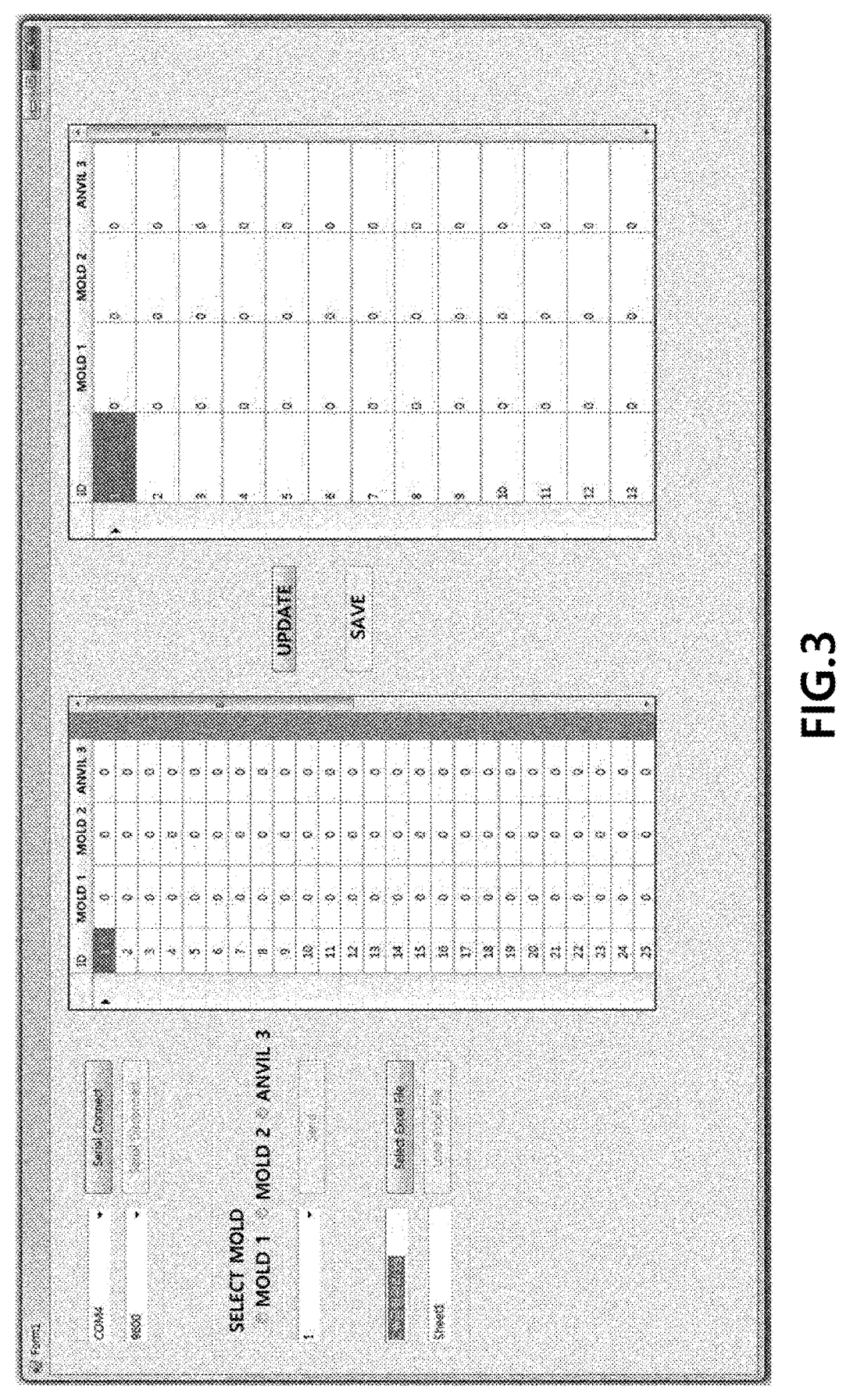

Referring to FIGS. 2 and 3, an example of a monitoring interface of up and down movement number information corresponding to identification information of at least one applicator fixture displayed on a display will be described below.

FIGS. 2 and 3 illustrate monitoring interfaces showing identification information and up and down movement number information of at least one applicator fixture according to an exemplary embodiment and another exemplary embodiment of the present invention.

Referring to FIG. 2, it is possible to see that up and down movement number information corresponding to identification information of applicator fixtures is displayed. Displayed cells may be shown in different colors according to up and down movement number information. For example, when an applicator fixture is not moved up and down, that is, when an up and down movement number information value is 0, the cell may be shown in a first color (e.g., white), when an up and down movement number information value is 1 to 4999, the cell may be shown in a second color (e.g., green), when an up and down movement number information value is 5000 to 9999, the cell may be shown in a third color (e.g., orange), and when an up and down movement number information value is 9999 or more, the cell may be shown in a fourth color (e.g., red). In this case, an applicator fixture shown in the fourth color (e.g., red) may be considered to have reached the end-of-life phase, and a user may be induced to replace the applicator fixture. A user may easily recognize an applicator fixture which has not currently operated from the white color shown in the display unit and replace an applicator fixture, which has reached the end-of-life phase, shown in red in the display unit.

Meanwhile, the reference values for color coding, corresponding colors, sections, etc. have been described as an example, and it is obvious that the reference values, corresponding colors, sections, etc. may be appropriately changed according to characteristics of each applicator fixture and a user's demand.

Referring to FIG. 3, it is possible to see that up and down movement number information is displayed according to identification information of applicator fixtures and the types of applicators (e.g., anvils) on which applicator fixtures are installed. In other words, up and down movement number information is displayed according to the types of installed applicators (e.g., anvils), and when the same applicator fixture is installed on different applicators, an up and down movement number may be displayed regarding each of the applicators. Other matters are the same as described with reference to FIG. 2.

Meanwhile, when up and down movement number information exceeds a threshold value which requires replacement, the interface module 500 may control an alarm unit of a slave module corresponding to, for example, an applicator fixture shown in the fourth color (e.g., red) in FIG. 2 and output an alarm. As described above, the alarm may correspond to any one of auditory (e.g., a speaker), visual (e.g., a lamp), and tactile (e.g., vibrations) manners. Although not shown in the drawing, it is obvious that each of the slave module 300 and the master module 400 may include a display unit and display up and down movement number information and the like of a corresponding applicator fixture through the display unit.

Figure 4:
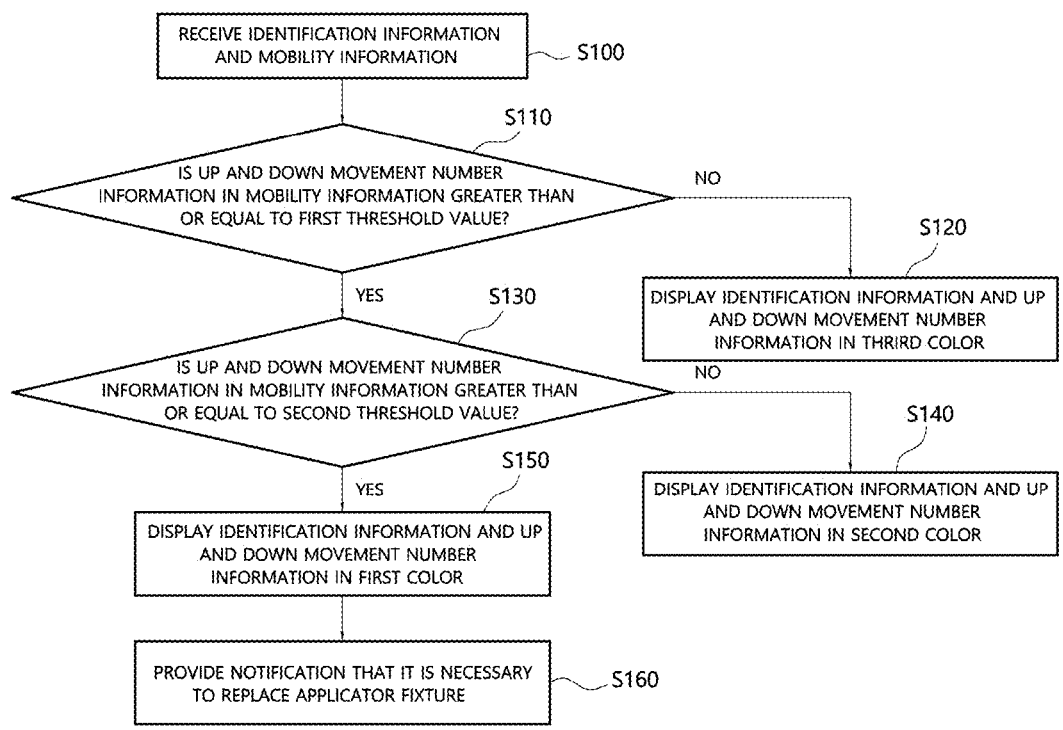
FIG. 4 illustrates a monitoring method according to an exemplary embodiment of the present invention.

FIG. 4 illustrates a monitoring method according to an exemplary embodiment of the present invention.

Referring to FIG. 4, it is possible to receive identification information of at least one applicator fixture and mobility information of a magnetic body corresponding to the applicator fixture (S100). The mobility information of the magnetic body may include up and down movement number information of the magnetic body. The up and down movement number information of the magnetic body may correspond to the number of strokes or the number of uses of the applicator fixture. It is determined whether the received up and down movement number information is a first threshold value or more (S110). The first threshold value is 1 and may indicate that the applicator has operated at least once. When the received up and down movement number information is not the first threshold value or more, the identification information and the up and down movement number information may be displayed, and the cell may be shown in a third color (e.g., white) (S120). When the received up and down movement number information is the first threshold value or more, it is determined whether the up and down movement number information is a second threshold value or more (S130). When the received up and down movement number information is not the second threshold value or more, the identification information and the up and down movement number information may be displayed, and the cell may be shown in a second color (e.g., green) (S140). The second threshold value is related to the number of strokess or the life of the applicator fixture resulting from the use and may be determined according to characteristics of the applicator fixture. In other words, when the up and down movement number information is the second threshold value or more, it is necessary to replace the applicator fixture. When the received up and down movement number information is the second threshold value or more, the identification information and the up and down movement number information may be displayed, and the cell may be shown in a first color (e.g. red) (S150). Also, an alarm unit may provide a notification that it is necessary to replace the applicator fixture in at least one of auditory (e.g. a speaker), visual (e.g. a lamp), and tactile (e.g. vibrations) manners (S160).

Although a case of replacing an applicator fixture when the number of strokes or the number of uses of the applicator fixture exceeds a preset number of strokes or a preset number of uses has been described as an example, the present invention is not limited thereto. According to the same technical spirit, it is obvious that when the number of strokess or the number of uses of an applicator fixture exceeds a preset value, a corresponding applicator may be replaced.

Exemplary embodiments of the present invention disclosed herein and the drawings are specific examples to facilitate description of the present invention and aid in understanding the present invention and are not intended to limit the scope of the present invention. Therefore, the scope of the present invention should be construed as encompassing not only the exemplary embodiments disclosed herein but also all modifications or alterations derived from the technical spirit of the present invention.

REFERENCE SIGNS LIST

100: monitoring device
200: magnetic sensor
300: slave module
400: master module
500: interface module

The invention claimed is:
1. A monitoring device for managing at least one applicator fixture installed on an applicator which has a magnetic body and connects a terminal to a wire via up and down movement, the monitoring device comprising:
- a magnetic sensor configured to be installed in the applicator and sense movement of the magnetic body;
- at least one slave module configured to receive identification information of the applicator fixture and mobility information of the magnetic body sensed by the magnetic sensor;
- a master module configured to receive the identification information of the applicator fixture and the mobility information of the magnetic body in real time from the at least one slave module; and
- an interface module configured to generate a monitoring interface showing a degree of use of the at least one applicator fixture using the identification information of the applicator fixture and the mobility information of the magnetic body.

2. The monitoring device of claim 1, wherein the slave module includes a radio frequency identification (RFID) reader, and
the RFID reader recognizes the identification information of the applicator fixture from an RFID tag provided in the applicator fixture.

3. The monitoring device of claim 1, wherein the slave module receives the identification information from a specific applicator fixture and receives the mobility information from a magnetic sensor provided in an applicator on which the specific applicator fixture is installed.

4. The monitoring device of claim 1, wherein the slave module includes an alarm unit configured to provide, when the identification information of the applicator fixture is received for the first time or the identification information of the applicator fixture is changed, a notification of the reception or the change.

5. The monitoring device of claim 4, wherein when the mobility information of the magnetic body exceeds a predetermined reference, the monitoring interface controls the alarm unit included in the slave master to output an alarm.

6. The monitoring device of claim 5, wherein the monitoring interface displays the mobility information of the magnetic body in different areas on a display unit according to the type of applicator on which the applicator fixture is installed.

7. The monitoring device of claim 4, wherein when the mobility information of the magnetic body exceeds a predetermined reference, the monitoring interface controls the alarm unit included in the slave master to output an alarm.

8. The monitoring device of claim 1, wherein the master module includes a short-range communication module,
the short-range communication module receives the identification information of the applicator fixture and the mobility information of the magnetic body from the slave module and includes at least one of a Bluetooth module, a radio frequency identification (RFID) module, an infrared communication module, a ZigBee module, a near-field communication (NFC) module, and a Wi-Fi module.

9. The monitoring device of claim 8, wherein the master module further includes a universal asynchronous receiver-transmitter (UART) module, and
the UART module transmits the identification information and the mobility information received from the at least one slave module to the monitoring interface.

10. The monitoring device of claim 1, wherein the mobility information of the magnetic body includes up and down movement number information of the applicator fixture.

11. A monitoring method for managing at least one applicator fixture installed on an applicator which has a magnetic body and connects a terminal to a wire via up and down movement, the monitoring method comprising:
- receiving identification information of the applicator fixture and mobility information of the magnetic body sensed by a magnetic sensor installed in the applicator; and
- displaying a degree of use of the applicator fixture using the received identification information of the applicator fixture and the received mobility information of the magnetic body,
wherein the mobility information of the magnetic body includes up and down movement number information of the applicator fixture, and
the displaying of the degree of use of the applicator fixture includes displaying the degree of use of the applicator fixture in different colors according to a value of the up and down movement number information or in different areas according to the type of applicator on which the applicator fixture is installed.

12. The monitoring method of claim 11, further comprising, when the up and down movement number information of the applicator fixture exceeds a predetermined value, controlling an alarm unit to provide a notification in at least one of auditory, visual, and tactile manners.

* * * * *